United States Patent
Carron et al.

(10) Patent No.: US 8,125,637 B2
(45) Date of Patent: Feb. 28, 2012

(54) OPTICAL BEAM SPECTROMETER WITH MOVABLE LENS

(75) Inventors: Keith T. Carron, Centennial, WY (US); Mark Watson, Laramie, WY (US); Shane Buller, Laramie, WY (US)

(73) Assignee: Intevac, Inc., Santa Clara, CA (US)

( * ) Notice: Subject to any disclaimer, the term of this patent is extended or adjusted under 35 U.S.C. 154(b) by 201 days.

(21) Appl. No.: 12/268,419

(22) Filed: Nov. 10, 2008

(65) Prior Publication Data

US 2009/0135417 A1    May 28, 2009

Related U.S. Application Data

(60) Provisional application No. 60/987,001, filed on Nov. 9, 2007.

(51) Int. Cl.
G01J 3/06 (2006.01)
G01J 3/44 (2006.01)
G01N 21/65 (2006.01)

(52) U.S. Cl. ...... 356/326; 356/301; 356/318; 250/201.4

(58) Field of Classification Search .................. 356/301, 356/317, 318
See application file for complete search history.

(56) References Cited

U.S. PATENT DOCUMENTS

| | | | |
|---|---|---|---|
| 5,459,325 A * | 10/1995 | Hueton et al. | 250/458.1 |
| 6,407,811 B1 | 6/2002 | Snyder et al. | |
| 6,643,012 B2 | 11/2003 | Shen et al. | |
| 6,771,369 B2 * | 8/2004 | Rzasa et al. | 356/326 |
| 6,804,001 B1 | 10/2004 | Leroux | |
| 2008/0044172 A1 * | 2/2008 | Tang et al. | 396/89 |

OTHER PUBLICATIONS

International Searching Authority; Korean Intellectual Property Office; International Search Report (Form PCT/ISA/210) for International application No. PCT/US2008/083064; Mar. 31, 2009; 3 pages.

International Searching Authority; Korean Intellectual Property Office; Written Opinion of the International Searching Authority (Form PCT/ISA/237) for International application No. PCT/US2008/083064; Mar. 31, 2009; 3 pages.

* cited by examiner

*Primary Examiner* — F. L. Evans
(74) *Attorney, Agent, or Firm* — Nixon Peabody LLP; Joseph Bach, Esq.

(57) ABSTRACT

A spectroscopic system is described that provides at least one of focus of an excitation beam onto a sample, automatic focus of an optical system of the spectroscopic system for collecting a spectroscopic signal, and/or averaging of excitation intensity over a surface area of the sample.

17 Claims, 12 Drawing Sheets

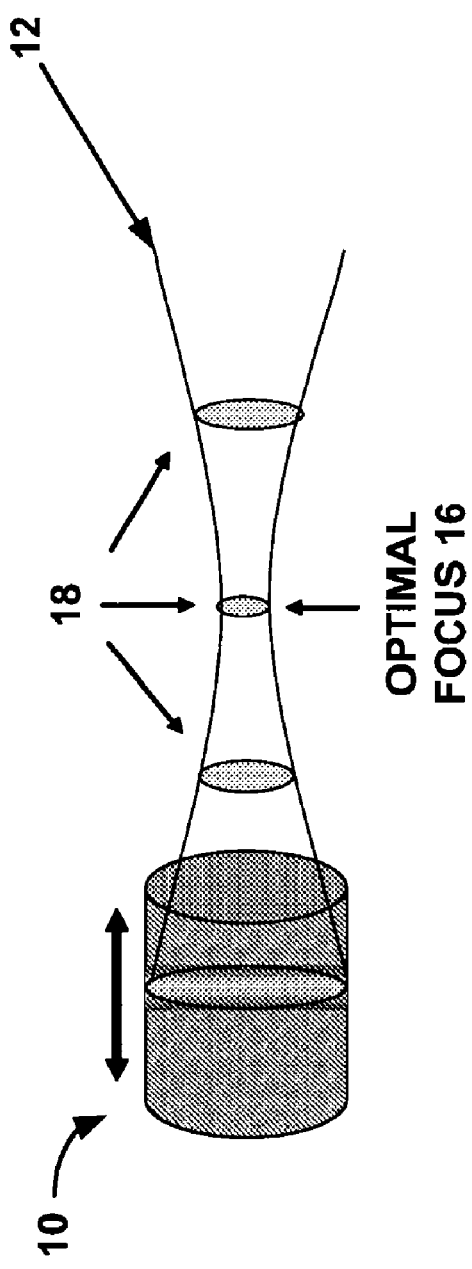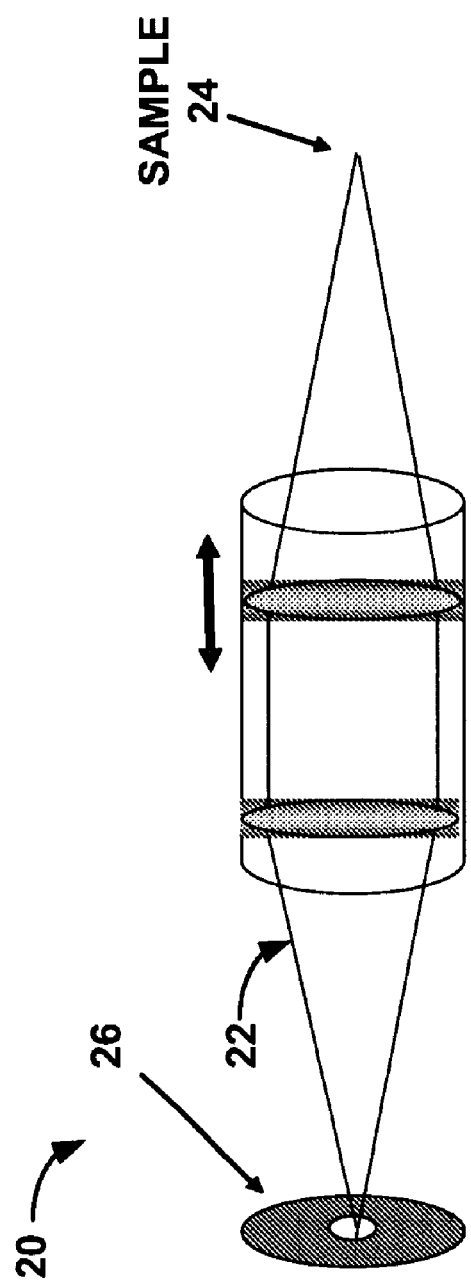
FIG. 1(A)
FIG. 1(B)

OPTICAL BEAM SPECTROMETER WITH MOVABLE LENS

CROSS REFERENCE

This application claims the benefit of priority pursuant to 35 U.S.C. §119(e) of U.S. provisional application No. 60/987,001 filed 9 Nov. 2007 entitled "Optical Beam Spectrometer," which is hereby incorporated herein by reference in its entirety.

BACKGROUND

Many spectroscopic measurement devices focus a light source on a sample to achieve a useable signal. The spectroscopic measurement devices often require a very tightly focused beam so that a signal image of a particular spot can pass though a small aperture. The small aperture is used to maintain a high level of spectroscopic resolution as it too is imaged onto a spectroscopic detector that includes a physical aperture, physically small detector, or pixel of a multichannel detector. In practice this has led to spectroscopic devices that have specialized precise mechanical mechanisms for focusing of the beam onto the sample or moving the sample to optimally place it with respect to the beam.

BRIEF DESCRIPTION

A spectroscopic system is described that provides at least one of focus of an excitation beam onto a sample, automatic focus of an optical system of the spectroscopic system for collecting a spectroscopic signal, and/or averaging of excitation intensity over a surface area of the sample.

In one embodiment, a spectroscopic system is provided comprising: a light source adapted to provide a beam of illumination; an optical system comprising an optical element, such as a lens or a prism, adapted to focus the beam of illumination on a sample and receive a spectroscopy signal from the sample; an electromechanical stage adapted to move the optical element along a spectroscopic axis; and a controller adapted to receive a plurality of spectroscopic measurements and control a focus of the optical element via the electro-mechanical stage based upon a comparison the plurality of spectroscopic measurements.

In another embodiment, a spectroscopic system is provided comprising: a light source adapted to provide a beam of illumination; an optical system comprising an optical element, such as a lens or a prism, adapted to focus the beam of illumination on a sample and receive a spectroscopy signal from the sample; an electromechanical stage adapted to move the optical element of the optical system; and a controller adapted to control the electro-mechanical stage to move the focused beam with respect to a sample.

A method to use an electromechanical stage to focus an optical element, such as a lens or a prism, through a sum of the pixels covered by a spectral region is also described. In one embodiment an electromechanical device uses an optical element, such as a lens or a prism, to move a focused beam across a surface of a sample to generate a sampling of the surface. The sample of the surface, for example, may comprise an average. In another embodiment, an electromechanical device moves a beam across a surface to achieve lower beam intensities at the sample during a signal measurement period. The latter can prevent heat or photo-damage to the sample during the measurement period.

BRIEF DESCRIPTION OF THE DRAWINGS

FIG. 1A illustrates a change in beam size corresponding to a change in a lens position of an example optical system.

FIG. 1B illustrates an example lens system of a spectroscopic system in which an illumination beam is imaged onto a sample through an aperture.

DETAILED DESCRIPTION

Figure 2:
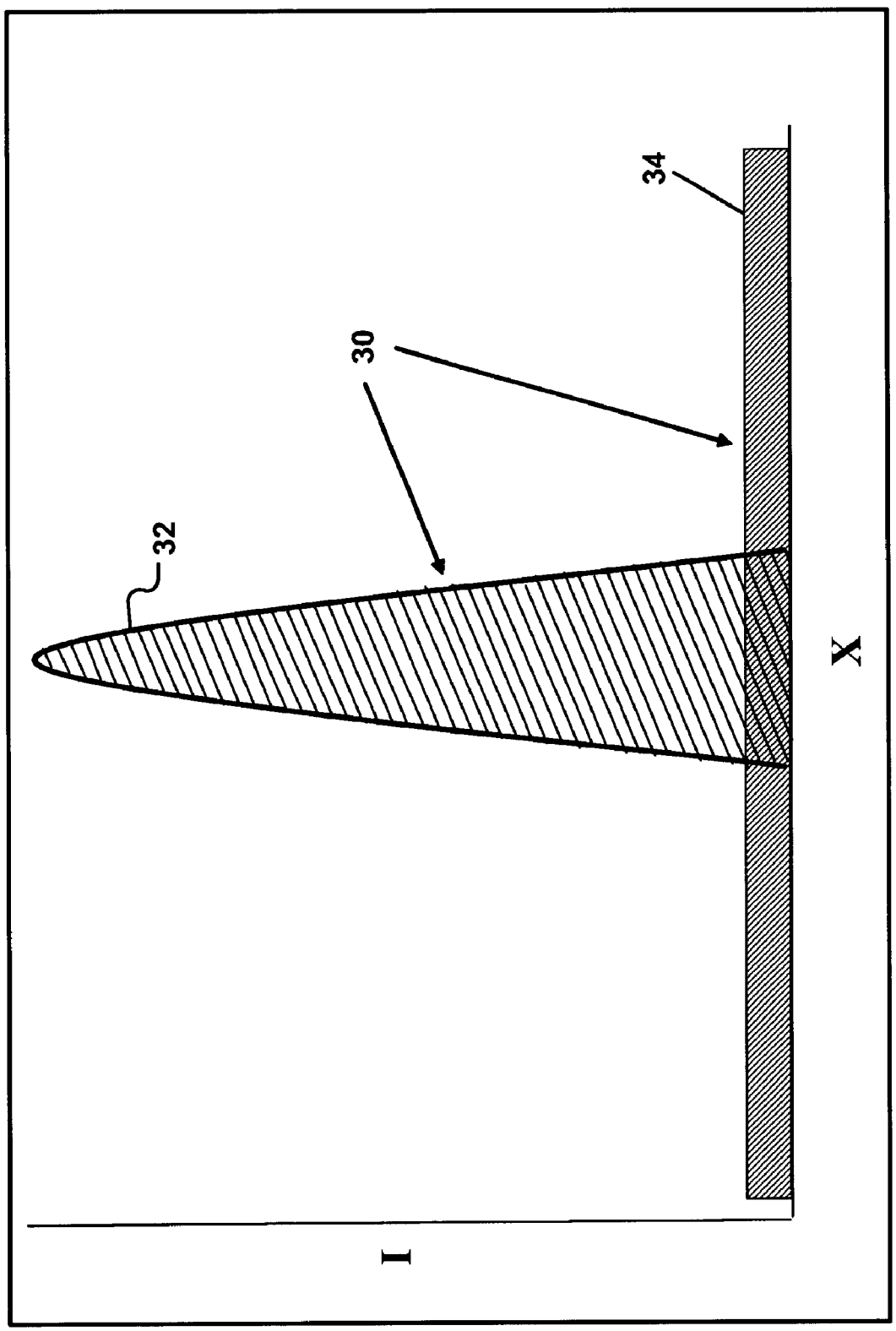
FIG. 2 shows a comparison of intensity of a fixed focused beam on a sample with a focused beam moved with respect to the sample.

Spectroscopic systems often have specialized precise mechanical mechanisms for focusing of a beam onto a sample or moving the sample to optimally place it with respect to the beam. These mechanisms, although they can function well in certain instruments, can limit the application of the spectroscopic systems for hand-held use or for rapid analysis without specific mechanical adjustments depending upon their size or adjustment requirements.

FIGS. 1A and 1B illustrate aspects of example optical designs for a sampling portion of a spectroscopic system. FIG. 1A, for example, illustrates a change in beam 12 size corresponding to a change in a lens 14 position of an example optical system 10, such as an optical system of a spectroscopic system. An optimal focus 16 of the optical system occurs at a focal point or focal area of the lens where the illumination beam is more tightly focused. The intensity of the beam at a sample 18 is defined as the number of photons per second per area at the sample. As shown in FIG. 1A, the intensity of the beam at the optimal focus 16 of the optical system 10 will produce the highest intensity level of the beam 12 at the sample 18.

FIG. 1B illustrates an example lens system 20 of a spectroscopic system in which an illumination beam 22 is imaged onto a sample 24 through an aperture 26. A signal reflected from the sample is also received by the optical system 20 of the spectroscopic system and imaged onto the aperture 26 of the system. Within the spectroscopic optical system 20 the reflected signal imaged on the aperture 26 is in turn imaged onto a detector of the spectroscopic system. The size of the aperture 26, in part, is a factor in the resolution of the spectroscopic system. If the sample 24 is located at a distance from the optical system 20 where the beam size is not sufficiently focused, for example, the image from the reflected signal will likewise be too broad to be completely imaged onto the aperture 26 of the spectroscopic optical system 20.

Although a small beam size is desired at the sample 24 of a spectroscopic system, the small beam size may cause poor spectroscopic analysis of a sample 24 (e.g., a heterogeneous sample) where only a portion of the sample 24 is illuminated by the beam. Pharmaceutical tablets, for example, often comprise heterogeneous mixtures of active ingredients and inactive fillers. While a practical measurement would be averaged over a surface of the tablet, the requirement for a tightly focused beam only measures a single location on the surface of the tablet. Thus, a single spectroscopic measurement may only detect a portion of the ingredients of the heterogeneous sample.

Another problem with focused spectroscopic measurement devices is that the focused light source may alter or even damage a sensitive sample. In Raman or fluorescence spectroscopy, for example, intense laser light sources are used to illuminate the sample sufficiently to produce a detectable signal. Often, in order to acquire a signal with sufficient strength to be detectable over detector noise, a long integration period (acquisition time) is required. This extended sampling time requires even longer periods for which a sample is exposed to intense radiation. Sensitive samples, such as a sample comprising a surface with active nanoparticles may be photosensitive and damaged by the focused light source. Where specific active nanoparticles in a confined area of the sample are continuously illuminated over a time period to acquire a signal, the nanoparticles could become inactive. Similarly, a material that absorbs the laser radiation and heats up due to the sampling radiation could lose integrity.

In one embodiment, a focused beam may illuminate an increased area of a sample by moving the focused beam with respect to the sample. The beam, for example, may be rastered or scanned across a surface of the sample to increase the surface area of the sample being measured or to decrease the intensity of the beam on a particular area of the sample over an equivalent acquisition period.

By moving the beam with respect to the sample, a beam may be sufficiently focused to allow for a measured signal to be imaged on an aperture of a spectroscopic system and still sample a larger area of the sample or decrease the intensity of the beam at the surface of the sample. In one embodiment, for example, the beam intensity may be averaged over an increased surface area of the sample. Since intensity is an amount of radiation per area, increasing the area of the sample illuminated by the beam decreases the intensity at the sample over an equivalent acquisition period. Averaging the beam intensity over the sample also provides the ability to achieve high sensitivity while increasing the sampled area. This is illustrated in FIG. 2 showing a graph with intensity I on one axis and an X dimension on the other axis. In FIG. 2 it is shown that an equivalent intensity 30 can be isolated in a single spot 32 or can be distributed over a larger area 34 in the X dimension to decrease the average intensity at the sample.

Figure 3:
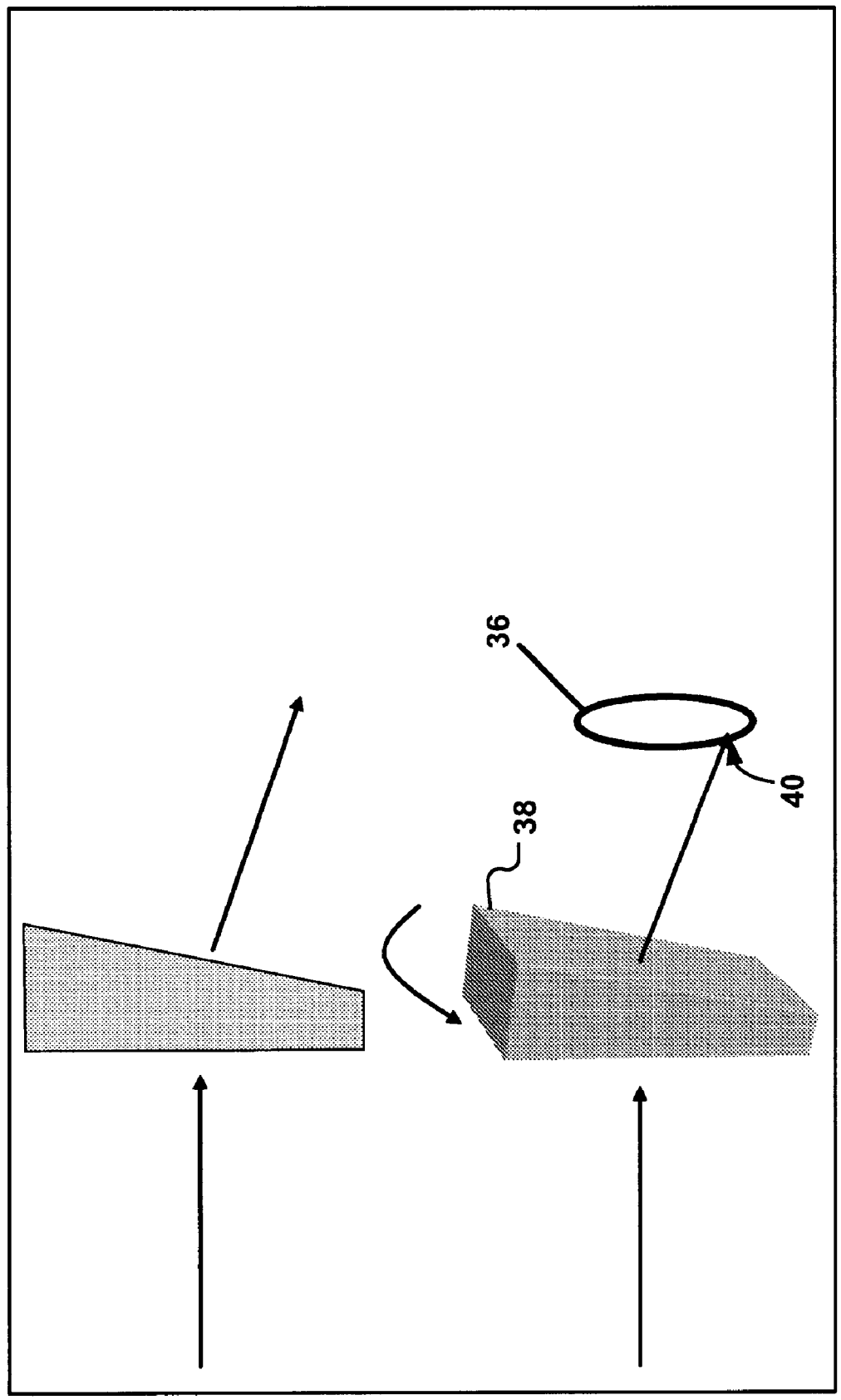
FIG. 3 illustrates an embodiment of a method to move a beam with respect to a sample.

One embodiment of a method to move a beam with respect to a sample is shown in FIG. 3. In this embodiment, a larger area 36 on the sample may be illuminated by the beam using a wedge-type prism 38 that when moved causes the beam position 40 to move. By moving the wedge prism during the acquisition period the beam intensity can be effectively decreased. Rather than provide the full intensity of the beam on one spot of the sample, a beam that moves across a surface of the sample has an intensity over an acquisition period that is reduced by the beam spot size divided by the area swept by the pattern produced by the wedge prism 38.

Each of the embodiments of moving a beam with respect to a sample (e.g., scanning or rastering the beam) takes advantage of an important principle of optics—that light paths are reversible. The reversibility of the path indicates that the signal radiation will come to the same point as the source. In other words, in an aligned system the wedge can move without causing a misalignment of the signal with the spectroscopic aperture.

Figure 4:
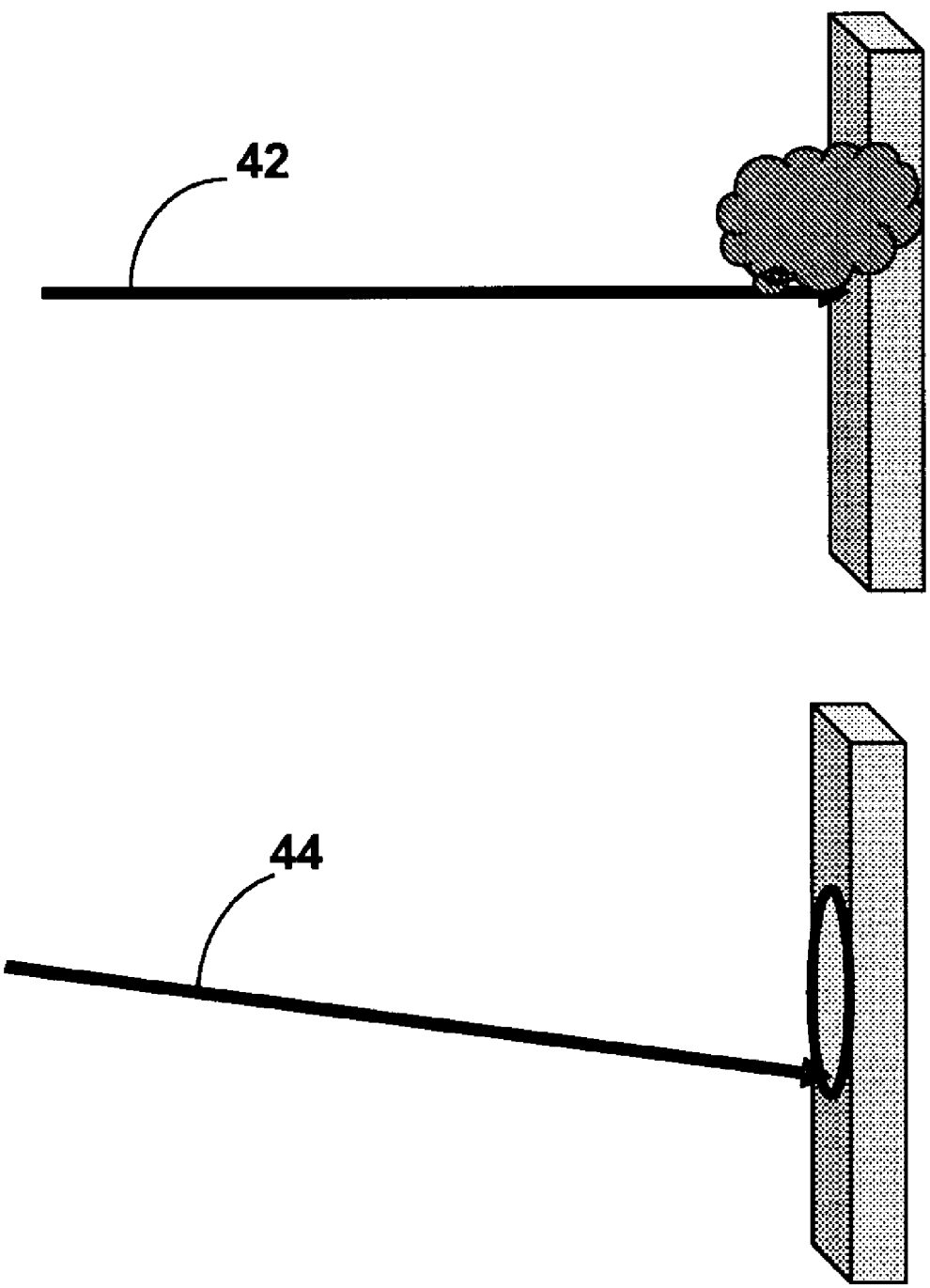
FIG. 4 illustrates a positive effect of a moving aperture system in which a static beam causes burning or potentially other damage to the sample, while moving a beam with respect to a sample is able to scan the sample without causing any damage to the sample.

FIG. 4 illustrates a positive effect of a moving aperture system in which a static beam 42 causes burning or potentially other damage to the sample, while a moving beam 44 is able to scan the sample without causing any damage to the sample.

Figure 5:
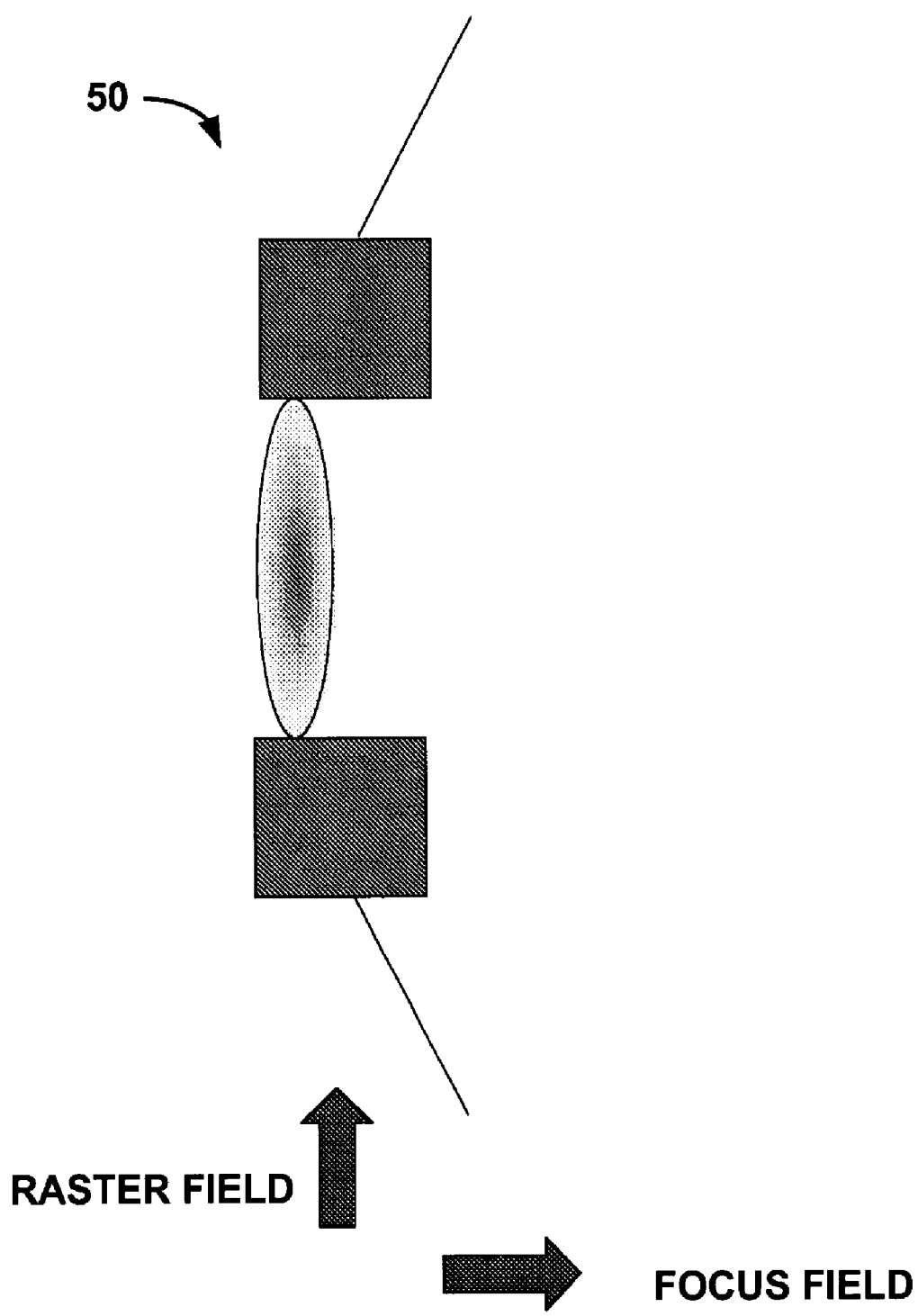
FIG. 5 illustrates an embodiment of an electromechanical optical stage for controlling a movement of a lens of a spectroscopic optical system.

Another method to achieve an increase in spectroscopic sampling areas is to position a lens onto an electromechanical optical stage. Such systems are common on compact disk players to rapidly maintain optimal focus and alignment with the optical information on the disk. Such an example electromechanical optical stage 50 is shown in FIG. 5. This stage 50 may be used to rapidly raster a sampling beam across a sample and position the beam to produce the spectroscopic signal.

Figure 6:
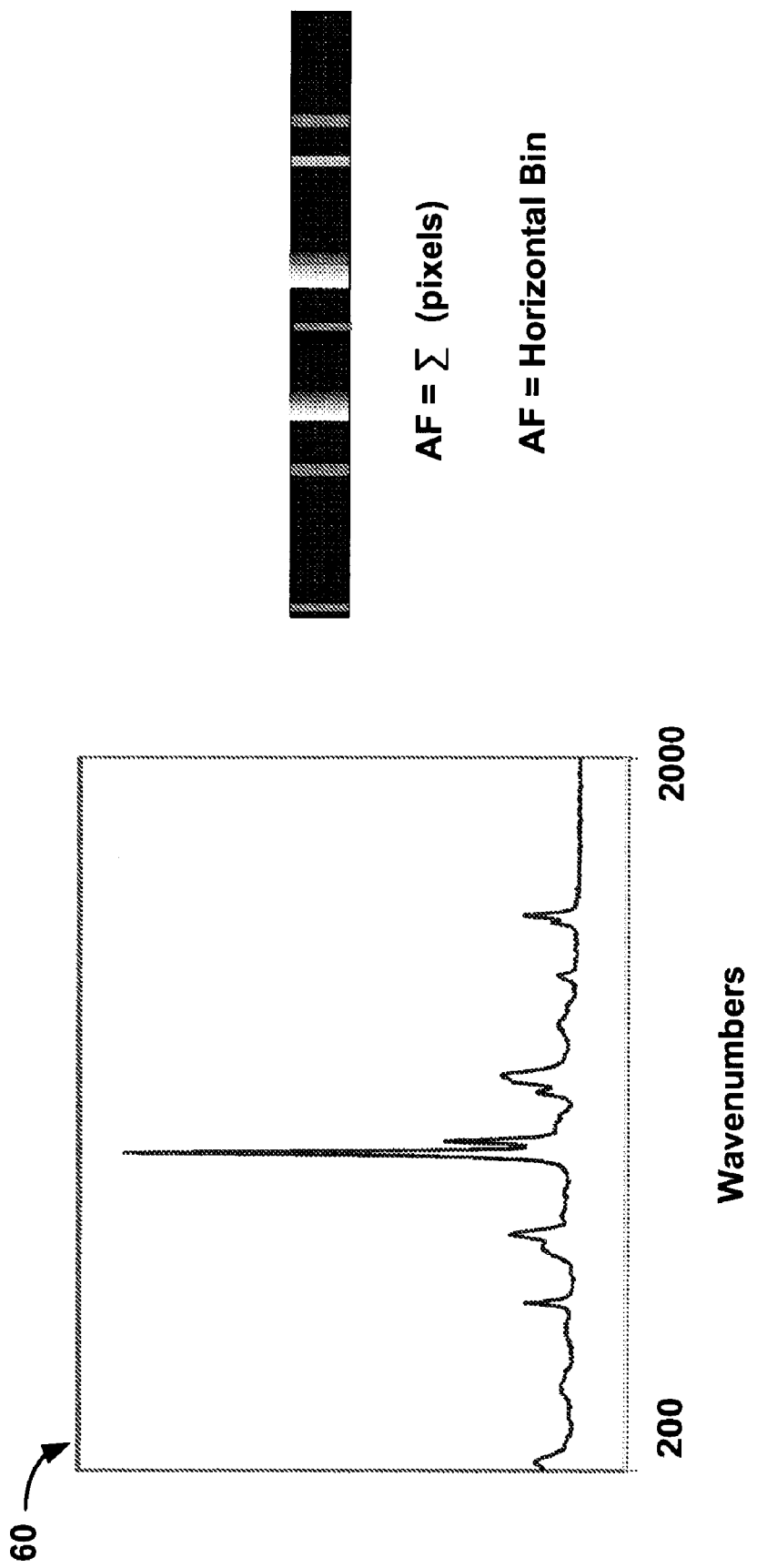
FIG. 6 illustrates an example optical signal summing (OSS) method that can be used to automatically determine an automatic focus location for a spectroscopic optical system.

FIG. 6 illustrates an example optical signal summing (OSS) method that can be used to automatically determine an automatic focus location of the optics in a spectroscopic system. In one embodiment, for example, a lens of the spectroscopic optical system can be moved incrementally as shown in FIG. 1B. At different locations, a spectrum 60 is taken of the sample to provide a spectrum signal. The spectrum signal is summed along a dispersion axis of the signal (e.g., by horizontal binning of the pixels of the spectroscope detector) to provide a spectroscopic focus signal. The spectroscopic focus signal can then be used to automatically determine a focus location. In one embodiment, the spectroscopic focus signal can be used to provide feedback to an electromechanical stage of the optical system, such as shown in FIG. 5. An automatic focus, for example, may be defined by the position of the lens that provides the largest spectroscopic focus signal representing a sum of the spectrum signal along the dispersion axis. In this embodiment, the focus on the sample is determined to be where the largest sum of pixels is found, and the autofocus electromechanical stage is controlled to focus the beam at that distance. Where a high speed binning process is used in which the entire horizontal axis is automatically summed ("binned") into a single pixel of the detector, the method provides a high speed way to automatically determine a focus and to provide a rapid control signal that can be used to position the electromechanical stage.

Figure 7:
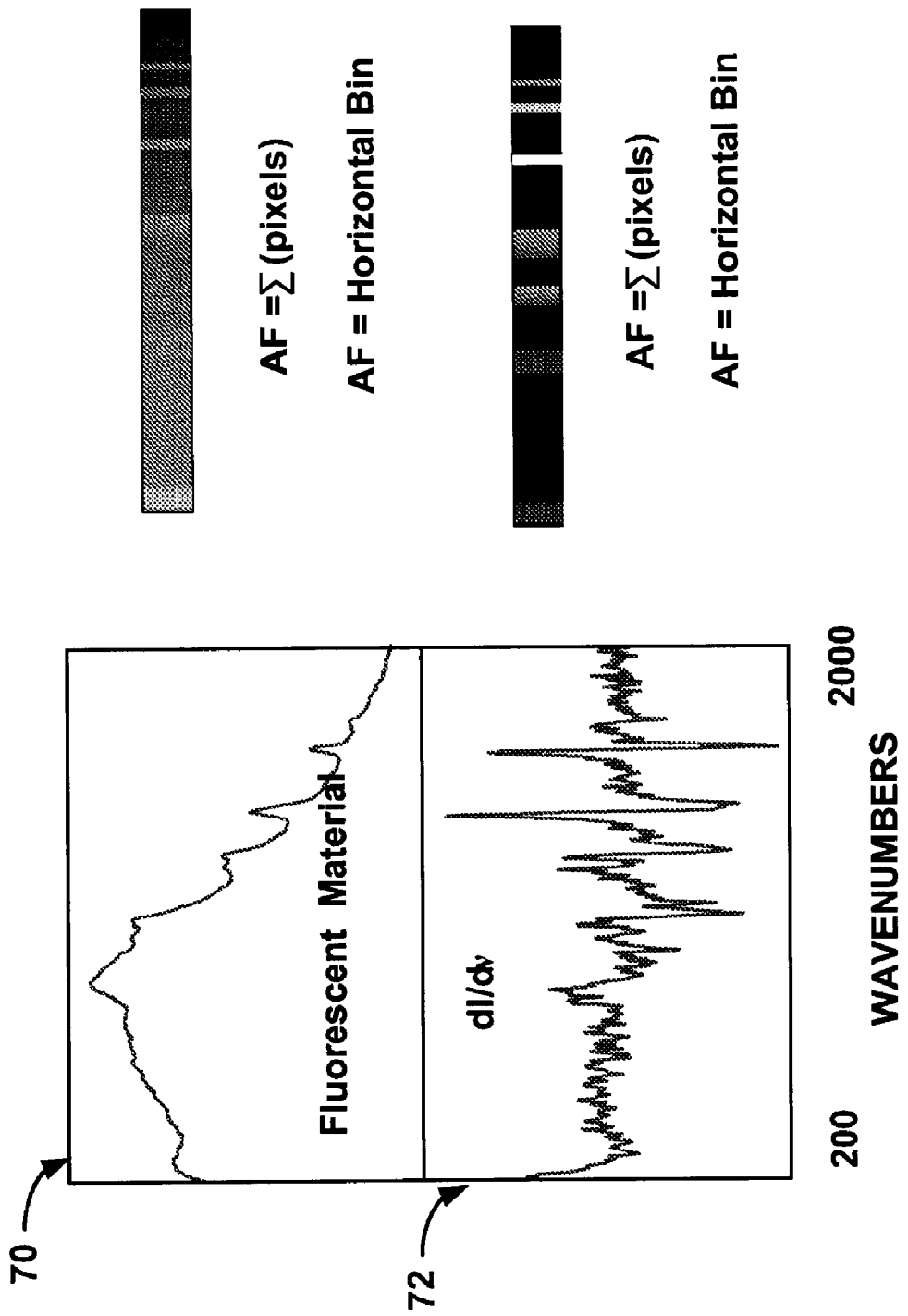
FIG. 7 illustrates another embodiment of a method of providing an automatic focus of a spectroscopic optical system that allows for the removal of background fluorescence before summing the spectrum signal along a dispersion axis.

FIG. 7 shows another embodiment of a method of providing an automatic focus of a spectroscopic optical system that allows for the removal of background fluorescence before summing a spectrum signal 70 along a dispersion axis. This embodiment, for example, may be useful in samples where the fluorescence signal maximizes at a different focus than the spectroscopic signal (e.g., a Raman signal). For example, fluorescence stems from exciting the sample at an electronic absorption. It is possible that this signal will saturate or decrease at the point where the optical signal (e.g., Raman signal) is optimized.

FIG. 7 shows one example of a method to remove the background fluorescence. In this embodiment, a simple derivative spectrum 72 can be calculated by shifting the spectrum 70 by a few pixels and subtracting the shifted spectrum from the original unshifted spectrum. The derivative spectrum 72 can then be converted into all positive numbers by taking an absolute value. This method may be of particular value, for example, when examining samples contained in glass containers since it is often observed that glass can produce a significant fluorescence peak that is unrelated to the sample inside the container. This alternative embodiment would reduce the signal from the glass container and produce an automatic focus onto the spectroscopic signal (e.g., Raman scattering from the sample).

Figure 8:
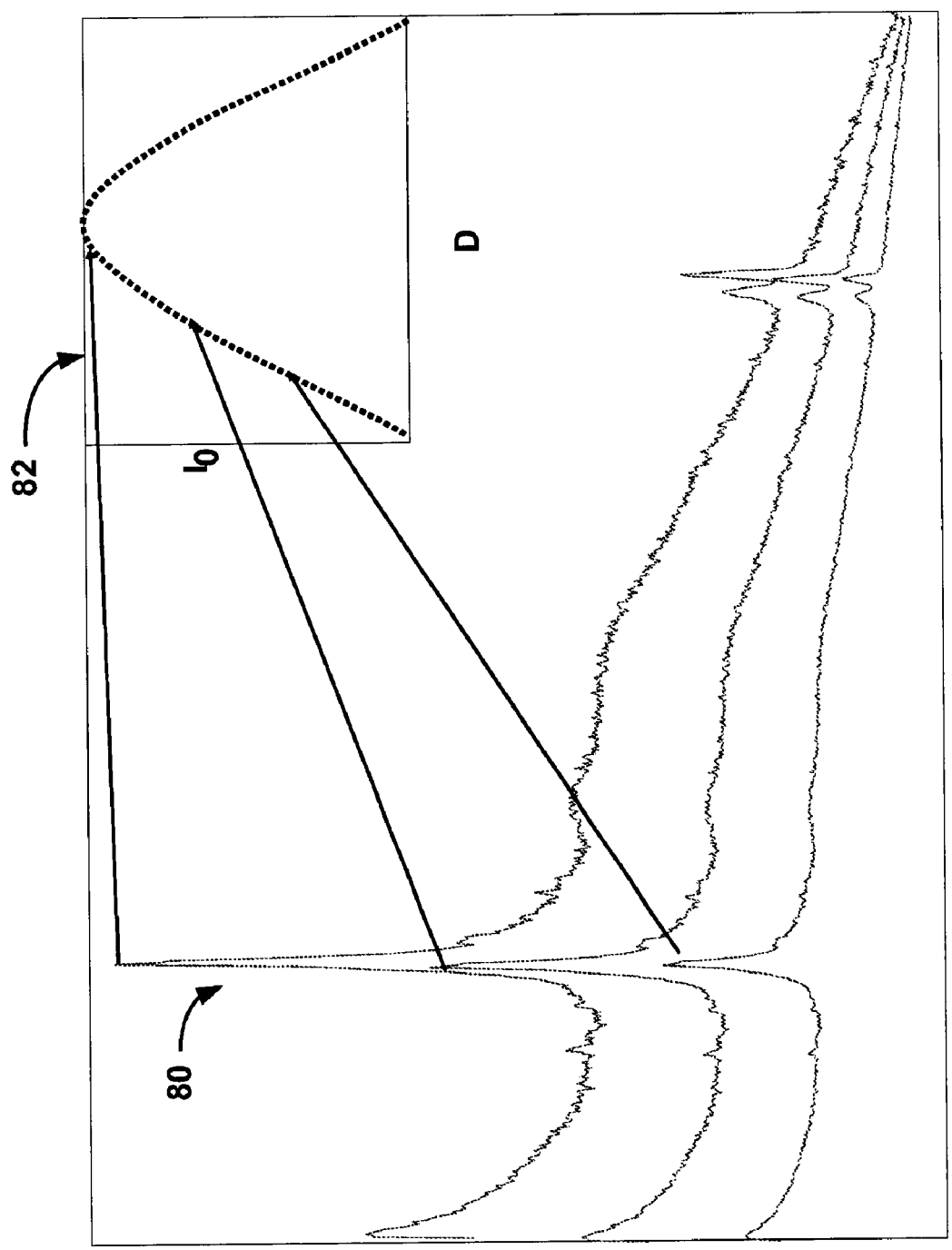
FIG. 8 illustrates yet another embodiment of a method for providing an automatic focus of a spectroscopic optical system using a spectral signature from a Raman spectrum.

Yet another embodiment of a method for providing an automatic focus of a spectroscopic optical system is shown in FIG. 8. In this embodiment, a spectral signature that is always present in a Raman spectrum is used. For a Raman spectroscope this is the Rayleigh line at zero (0) wavenumbers 80. When the lens of the spectroscopic optical system is moved to a new location, a Raman signal and a zero-order signal are taken by the spectroscopic system. The zero-order signal, for example, may be determined via a grating of the optical system or a filter that removes the non-Raman portion of the signal received from the sample. The inset 82 shown in FIG. 8 shows how this signal will change with the distance from an optimal focus. In this embodiment, the automatic focus can account for the mixing of the Rayleigh signal with reflections of laser light at the same spectral position that may not correlate with the optimal focus.

Figure 13:
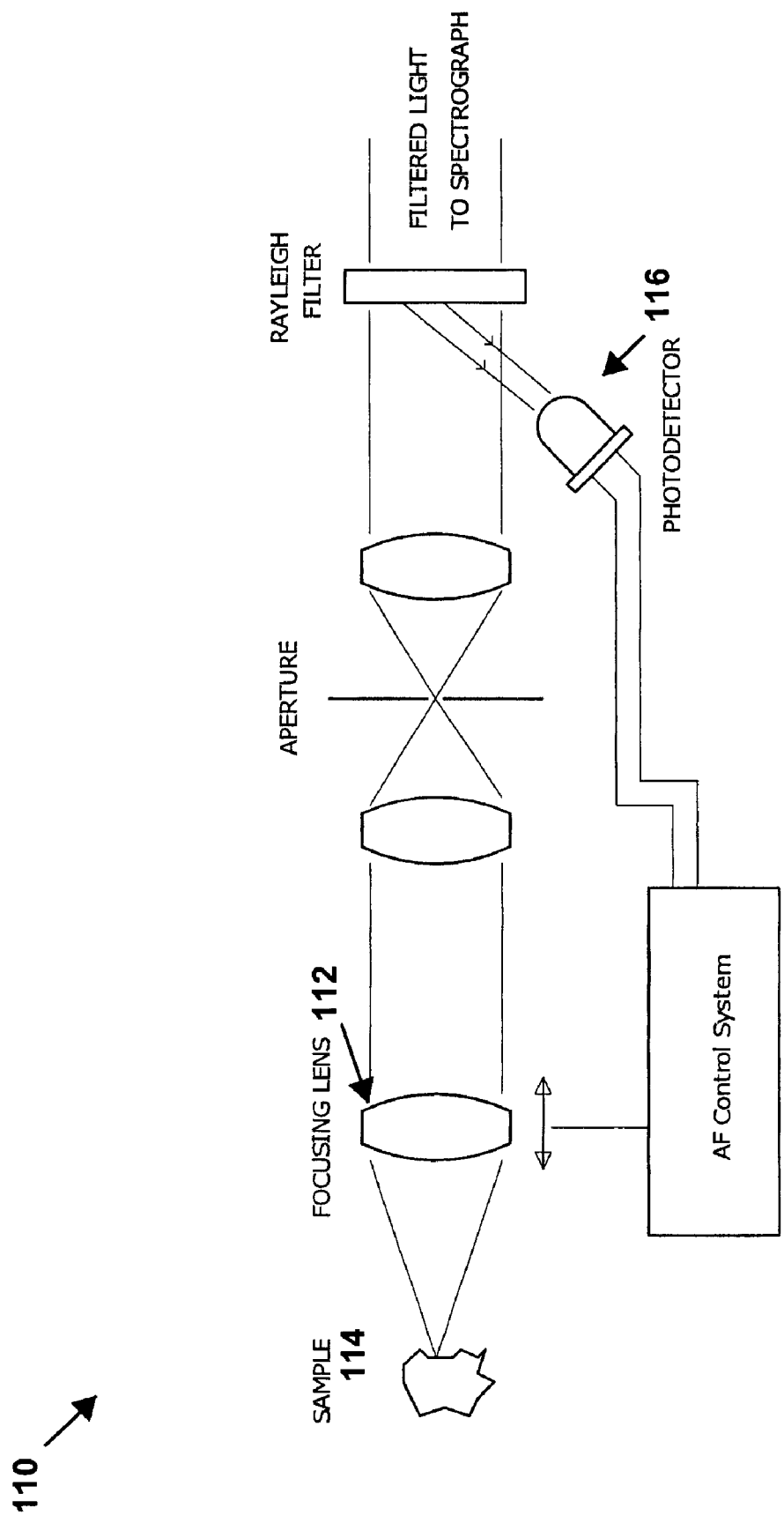
FIG. 13 illustrates an example of a spectroscopic system.

FIG. 13 shows an example of an optical spectroscopic system 110 that may be used to provide automatic focus of the system as described above with respect to FIG. 8. In this embodiment, an automatic focus control system operates a lens 112 to move the lens 112 with respect to the sample 114. The control system receives feedback from a photodetector 116.

Figure 9:
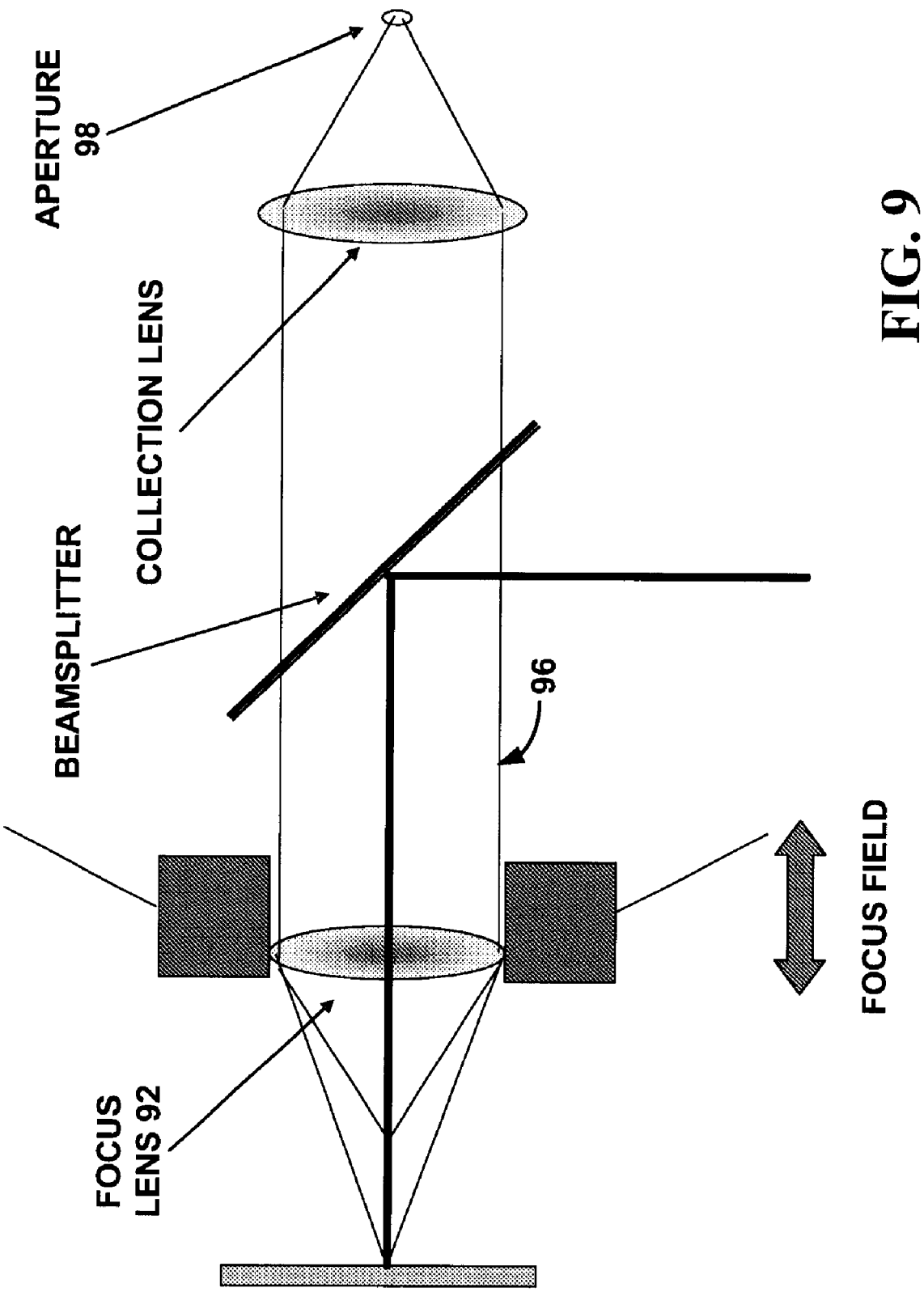
FIG. 9 illustrates one embodiment of an automatic focus system including a free-space design.

FIG. 9 illustrates one embodiment of an automatic focus system 90 including a free-space design. In this embodiment, for example, a focus lens 92 mounted on an electromechanical stage may be used to move the lens toward and away from the sample 94. One such free-space collimated beam design is disclosed in U.S. patent application Ser. No. 10/859,372 entitled "Raman Spectrometer" and filed on Jun. 1, 2004, which is incorporated by reference in its entirety. A free-space design provides an easily adaptable system that uses a focus lens 92 to focus the excitation source onto the sample 94 and to collect the spectroscopic signal (e.g., Raman scattered signal) from the sample 94. One feature of this particular embodiment is that it produces a collimated beam 96 after the spectroscopic signal (e.g., the Raman scattered signal) is collected. The collimated beam 96 aligns with an aperture 98 of the spectroscopic regardless of the focus lens location. The focus field, for example, may be moved in and out using electromagnetic fields or other control options. An automatic focus may be determined by any of the methods described above or other automatic focus systems.

Figure 10:
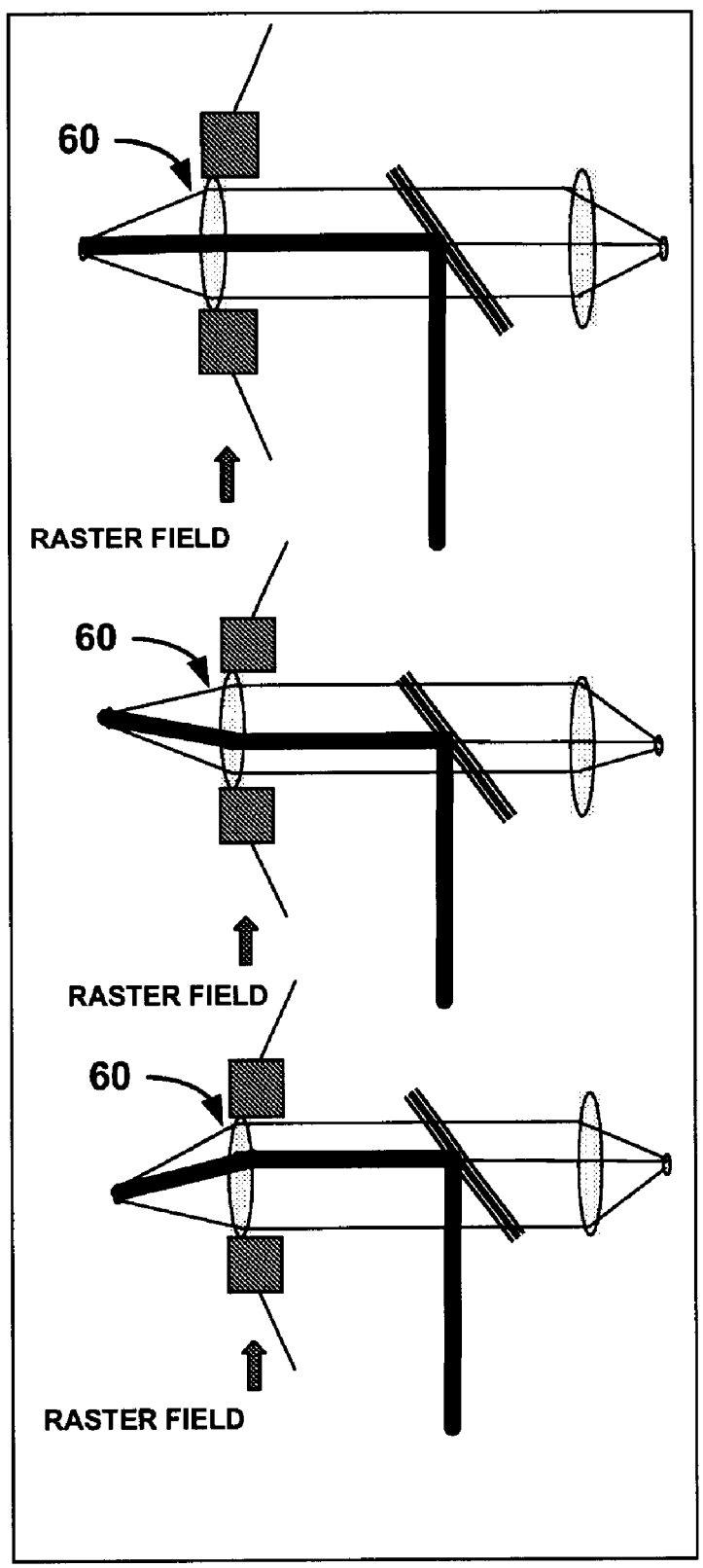
FIG. 10 illustrates an embodiment of a system for moving a beam of a spectroscopic system with respect to a sample.

The same electromechanical lens stage can be used to move the beam in other dimensions. This is illustrated in FIG. 10 where the focus lens 100 is moved in an orthogonal direction to the spectroscopic axis of the optical system (e.g., a raster field). As seen in FIG. 10, the movement of the lens in the direction orthogonal to the spectroscopic axis of the optical system moves the beam up and down, while maintaining alignment with the spectrograph aperture. Free running the electromechanical stage may cause the beam to move across the surface very rapidly at a rate faster than the acquisition time of the spectrograph. This will average the signal across the surface across the surface and effectively decrease the power density.

Figure 11:
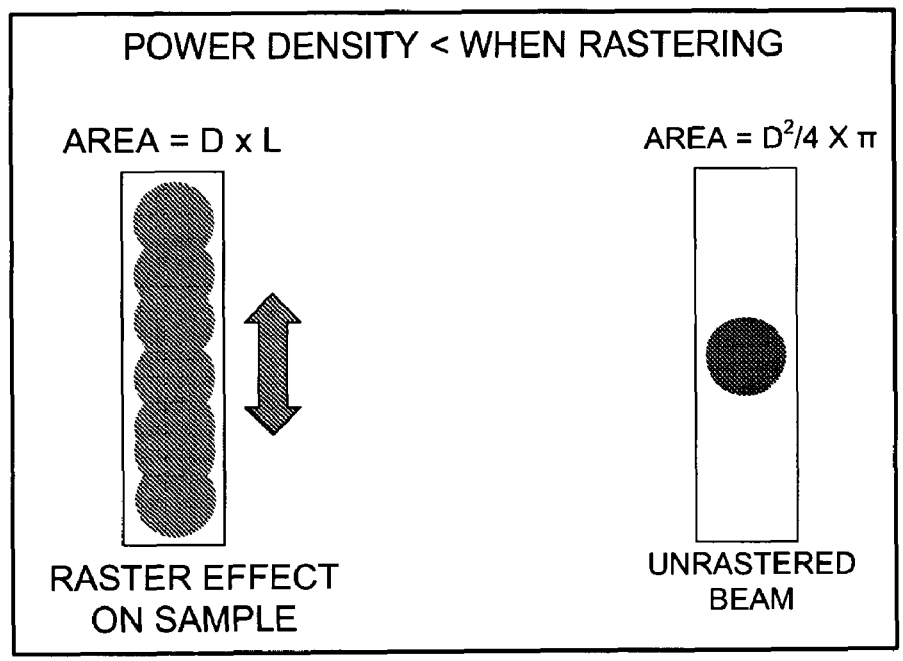
FIG. 11 illustrates an example of rastering a beam in a direction orthogonal to a spectroscopic beam axis.

FIG. 11 depicts an example of rastering of the beam in a direction orthogonal to a spectroscopic beam axis. The beam on the surface is effectively enlarged by the ratio of the rectangular area divided by the spot size. This reduces the potential damage to the surfaces of a sample due to high laser power density and will average over the surface (e.g., where the sample includes a heterogeneous surface composition).

Rastering (or otherwise moving) the beam could also be used to increase the beam time on a moving sample. For example, if a reader is being used to follow a material as it is flowing, the beam can be translated at the flow rate to prolong its incidence on the sample. For example, reading moving items (e.g. currency marked with a Raman-active (or other spectroscopic-active) tag) may be accomplished by allowing the reader to follow a spot on the moving items and the time that the laser is on the spot could be maximized by moving the beam at the same rate as the moving items.

Surface Examination

A further application of this device is a hand-held inspection system to examine a surface along one dimension. As described above, a beam may be moved along a surface of a sample to reduce power density of light at the sample and/or to average a measurement over a surface of the sample to include surface heterogeneities.

In another embodiment, a measurement may be taken to measure the profile of spectroscopic (e.g., Raman) changes over one dimension. In one of many possible applications, a measurement of stress or chemical variations at a junction between two materials may be taken. In the semiconductor industry, for example, semiconductor junctions are universally used to produce desired changes in current flow. In addition to the desired electrical properties that a junction might produce, however, the junction may also produce undesired stress in the materials. In the plastics industry, plastics are typically desired to be in their lowest energy state such that warping, strain, and the like do not occur at a later time. However, when two plastics are "welded" the welding process can induce strain in the two weld materials and this strain can be a site of failure in the product.

Figure 12:
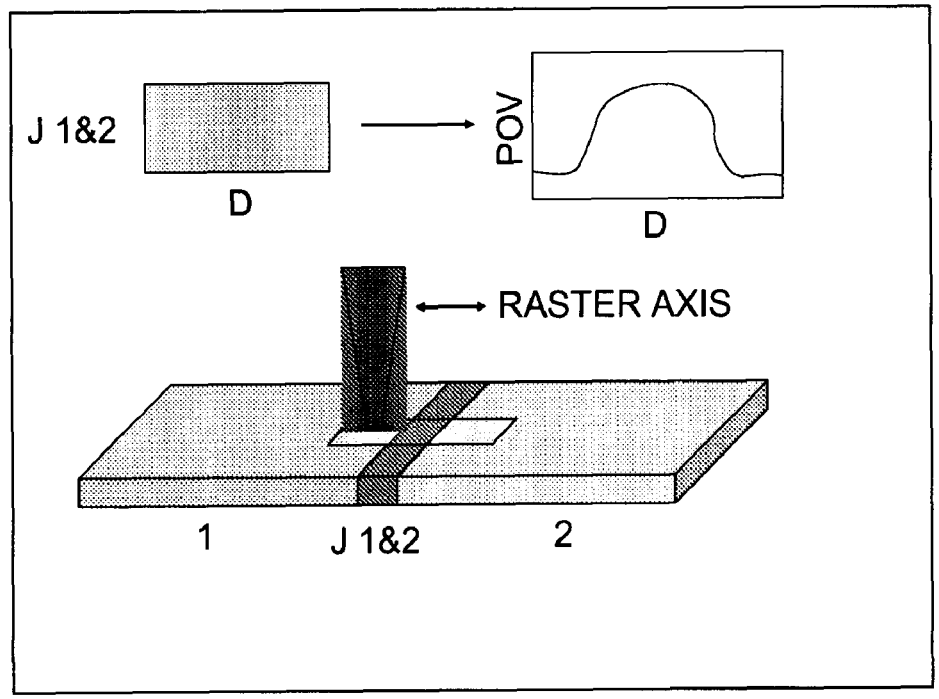
FIG. 12 illustrates an example of a spectroscopic system for analyzing surface heterogeneity.

A conceptual drawing of the method is shown in FIG. 12. This figure shows how the same raster mechanisms described above can be used to determine and record surface heterogeneity. The drawing shows two materials (1 and 2) joined at a junction (J 1&2). A measurement of the Raman spectrum along the axis produces a series of spectra along the axis. It is well known in Raman spectroscopy that the spectra are dependent in stress or other environmental factors. A plot of a Raman parameter of value (POV) versus distance rastered is shown in the inset in the top right. The POV could be a spectral correlation, shift in a Raman band, intensity of a Raman feature, or other value in the Raman spectrum that can change at a junction.

This measurement could also be used to determine the degree of heterogeneity in samples. A junction represents a single heterogeneity; however, many materials are composed of small crystalline structure called grains. The size and distribution of the grains controls the materials properties. Or the sample may be composed of several materials, the distribution of which controls the materials properties. The device to raster the laser across the surface could measure these heterogeneities.

Although embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A spectroscopic system comprising:
 a light source adapted to provide a beam of illumination;
 an optical system comprising an optical element adapted to focus the beam of illumination on a sample and receive a spectroscopy signal from the sample;
 an electro-mechanical stage adapted to move the optical element along a spectroscopic axis; and
 a controller adapted to (i) receive a plurality of spectroscopic measurements taken with the optical element disposed in different locations along the spectroscopic axis and (ii) control the focus of the beam of illumination via the electro-mechanical stage based upon a comparison of the plurality of spectroscopic measurements; and,
 wherein the controller is adapted to sum each of the plurality of the spectroscopic signals along a dispersion axis and compare the sums.

2. A spectroscopic system according to claim 1 wherein the controller is adapted to sum each of the spectroscopic signals along a dispersion axis via a horizontal bin of a detector.

3. A spectroscopic system according to claim 1 wherein the optical element comprises a lens.

4. A spectroscopic system according to claim 1 wherein the spectroscopic system comprises a hand-held spectrometer.

5. A spectroscopic system comprising:
 a light source adapted to provide a beam of illumination;
 an optical system comprising an optical element adapted to focus the beam of illumination on a sample and receive a spectroscopy signal from the sample;
 an electro-mechanical stage adapted to move the optical element along a spectroscopic axis; and
 a controller adapted to (i) receive a plurality of spectroscopic measurements taken with the optical element disposed in different locations along the spectroscopic axis and (ii) control the focus of the beam of illumination via the electro-mechanical stage based upon a comparison of the plurality of spectroscopic measurements; and,
 wherein the optical element comprises a prism.

6. A spectroscopic system according to claim 5 wherein the prism comprises a wedge prism.

7. A spectroscopic system comprising:
 a light source adapted to provide a beam of illumination;
 an optical system comprising an optical element adapted to focus the beam of illumination on a sample and receive a spectroscopy signal from the sample;
 an electro-mechanical stage adapted to move the optical element along a spectroscopic axis; and
 a controller adapted to (i) receive a plurality of spectroscopic measurements taken with the optical element disposed in different locations along the spectroscopic axis and (ii) control the focus of the beam of illumination via the electro-mechanical stage based upon a comparison of the plurality of spectroscopic measurements; and,
 wherein the electro-mechanical stage is adapted to move the optical element to raster the beam across the sample.

8. A spectroscopic system comprising:
 a light source adapted to provide a beam of illumination;
 an optical system comprising an optical element adapted to focus the beam of illumination on a sample and receive a spectroscopy signal from the sample;
 an electro-mechanical stage adapted to move the optical element along a spectroscopic axis; and
 a controller adapted to (i) receive a plurality of spectroscopic measurements taken with the optical element disposed in different locations along the spectroscopic axis and (ii) control the focus of the beam of illumination via the electro-mechanical stage based upon a comparison of the plurality of spectroscopic measurements; and,
 wherein the electro-mechanical stage is adapted to move the optical element to scan the beam across the sample.

9. A spectroscopic system comprising:
 a light source adapted to provide a beam of illumination;
 an optical system comprising an optical element adapted to receive the beam of illumination along a spectroscopic axis, focus the beam of illumination on a sample and receive a spectroscopy signal from the sample;
 an electro-mechanical stage adapted to move the optical element of the optical system; and
 a controller adapted to control the electro-mechanical stage to alter a path of the beam of illumination with respect to the spectroscopic axis by moving the optical element with respect to the spectroscopic axis.

10. A spectroscopic system according to claim 9 wherein the optical element comprises a lens.

11. A spectroscopic system according to claim 9 wherein the optical element comprises a prism.

12. A spectroscopic system according to claim 11 wherein the prism comprises a wedge prism.

13. A spectroscopic system according to claim 9 wherein the controller is adapted to control the electro-mechanical stage to scan the focused beam across a surface area of a sample.

14. A spectroscopic system according to claim 9 wherein the controller is adapted to control the electro-mechanical stage to raster the focused beam across a surface area of a sample.

15. A spectroscopic system according to claim 9 wherein the electro-mechanical stage is adapted to move the optical element orthogonally to the illumination beam.

16. A spectroscopic system according to claim 9 wherein the optical element comprises a wedge prism and the electro-mechanical stage is adapted to move the wedge prism with respect to the beam of illumination to change the path of the beam of illumination.

17. A spectroscopic system according to claim 9 wherein the controller is further adapted to average a plurality of spectroscopic signals received in response to moving the illumination beam across a surface of a sample.

* * * * *